US008570713B2

(12) United States Patent
Kumfer et al.

(10) Patent No.: US 8,570,713 B2
(45) Date of Patent: Oct. 29, 2013

(54) ELECTRICAL DISTRIBUTION SYSTEM INCLUDING MICRO ELECTRO-MECHANICAL SWITCH (MEMS) DEVICES

(75) Inventors: Brent Charles Kumfer, Farmington, CT (US); Peter James Greenwood, Cheshire, CT (US); Brian Frederick Mooney, Colchester, CT (US); Thomas Frederick Papallo, Jr., Farmington, CT (US); Kanakasabapathi Subramanian, Chennai (IN)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 13/172,214

(22) Filed: Jun. 29, 2011

(65) Prior Publication Data

US 2013/0003262 A1 Jan. 3, 2013

(51) Int. Cl.
*H02B 1/00* (2006.01)
*H02B 1/26* (2006.01)

(52) U.S. Cl.
USPC ............ 361/601; 361/611; 361/622; 361/624

(58) Field of Classification Search
USPC .......................................................... 361/622
See application file for complete search history.

(56) References Cited

U.S. PATENT DOCUMENTS

| | | | | |
|---|---|---|---|---|
| 7,542,250 | B2 | 6/2009 | Premerlani et al. | |
| 7,612,971 | B2 | 11/2009 | Premerlani et al. | |
| 7,885,043 | B2 | 2/2011 | Kumfer et al. | |
| 7,903,382 | B2 | 3/2011 | Premerlani et al. | |
| 2008/0308394 | A1 | 12/2008 | Premerlani et al. | |
| 2008/0310057 | A1 | 12/2008 | Kumfer et al. | |
| 2008/0310058 | A1 | 12/2008 | Premerlani et al. | |
| 2009/0161277 | A1 | 6/2009 | Roesner et al. | |
| 2011/0149483 | A1 | 6/2011 | Diaz et al. | |
| 2012/0169266 | A1 * | 7/2012 | Anand et al. | 318/519 |

FOREIGN PATENT DOCUMENTS

| | | | |
|---|---|---|---|
| EP | 2337043 | A1 | 6/2011 |
| WO | 2008/153575 | A1 | 12/2008 |

OTHER PUBLICATIONS

"Novel Concept for Medium Voltage Circuit Breakers Using Microswitches", George G. Karady et al., IEEE Transactions on Power Delivery, vol. 21, No. 1, Jan. 2006, pp. 536-537.

Search Report and Written Opinion from EP Application No. 12173514.6, dated Oct. 25, 2012.

* cited by examiner

*Primary Examiner* — Gregory Thompson
(74) *Attorney, Agent, or Firm* — Cantor Colburn LLP

(57) ABSTRACT

An electrical distribution system includes at least one circuit breaker device having an electrical interruption system provided with an electrical pathway, at least one micro electro-mechanical switch (MEMS) device electrically coupled in the electrical pathway, at least one hybrid arcless limiting technology (HALT) connection, and at least one control connection. A HALT circuit member is electrically coupled to HALT connection on the circuit breaker device and a controller is electrically coupled to the control connection on the circuit breaker device. The controller is configured and disposed to selectively connect the HALT circuit member and the at least one circuit breaker device via the HALT connection to control electrical current flow through the at least one circuit breaker device.

20 Claims, 5 Drawing Sheets

ELECTRICAL DISTRIBUTION SYSTEM INCLUDING MICRO ELECTRO-MECHANICAL SWITCH (MEMS) DEVICES

BACKGROUND OF THE INVENTION

The subject matter disclosed herein relates to the art of electrical control systems and, more particularly, to an electrical distribution system including micro electro-mechanical switch (MEMS) devices.

Circuit breakers are used to protect electrical circuits from damage due to an overload condition or a short circuit condition. Certain circuit breakers provide protection to uses by sensing ground and arc fault conditions. Upon sensing an overload, a short circuit condition, and/or a fault, the circuit breaker interrupts power to the electric circuit to prevent, or at least minimize, damage to circuit components and/or prevent injury. Currently, circuit breakers independently sense and respond to an over current condition in an associated electrical circuit. As such, each circuit breaker must include dedicated current sensing devices, thermal sensing devices, control devices, and mechanical switch devices. The mechanical switch devices are operated by the control devices to cut-off electrical current passing through the circuit breaker in response to signals indicating an over current condition or short circuit from the current and thermal sensing devices.

BRIEF DESCRIPTION OF THE INVENTION

According to one aspect of the exemplary embodiment, an electrical distribution system includes at least one circuit breaker device having an electrical interruption system provided with an electrical pathway, at least one micro electro-mechanical switch (MEMS) device electrically coupled in the electrical pathway, at least one hybrid arcless limiting technology (HALT) connection, and at least one control connection. A HALT circuit member is electrically coupled to HALT connection on the circuit breaker device and a controller is electrically coupled to the control connection on the circuit breaker device. The controller is configured and disposed to selectively connect the HALT circuit member and the at least one circuit breaker device via the HALT connection to control electrical current flow through the at least one circuit breaker device.

According to another aspect of the exemplary embodiment, an electrical load center includes a main housing having a plurality of walls that define an interior portion, a bus bar extending within the interior portion of the main housing and at least one circuit breaker device electrically coupled to the bus bar. The at least one circuit breaker includes an electrical interruption system having an electrical pathway, at least one micro electro-mechanical switch (MEMS) device electrically coupled in the electrical pathway, at least one hybrid arcless limiting technology (HALT) connection, and at least one control connection. A HALT circuit member is electrically coupled to HALT connection on the circuit breaker device, and a controller is electrically coupled to the control connection on the circuit breaker device. The controller is configured and disposed to selectively connect the HALT circuit member and the at least one circuit breaker device via the HALT connection to control electrical current flow through the at least one circuit breaker device.

According to yet another aspect of the exemplary embodiment, a method of controlling an electrical circuit in an electrical load center includes signaling a circuit breaker device having at least one micro electro-mechanical switch (MEMS) device to pass an electrical current through an electrical pathway, closing a hybrid arcless limiting technology (HALT) switch to pass a signal to the at least one MEMS device, switching the MEMS device to conduct the electrical current through the electrical pathway, sensing an undesirable current parameter of the electrical current, opening the HALT switch to cut off the signal to the at least one MEMS device, and switching the at least one MEMS device to open the electrical pathway.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
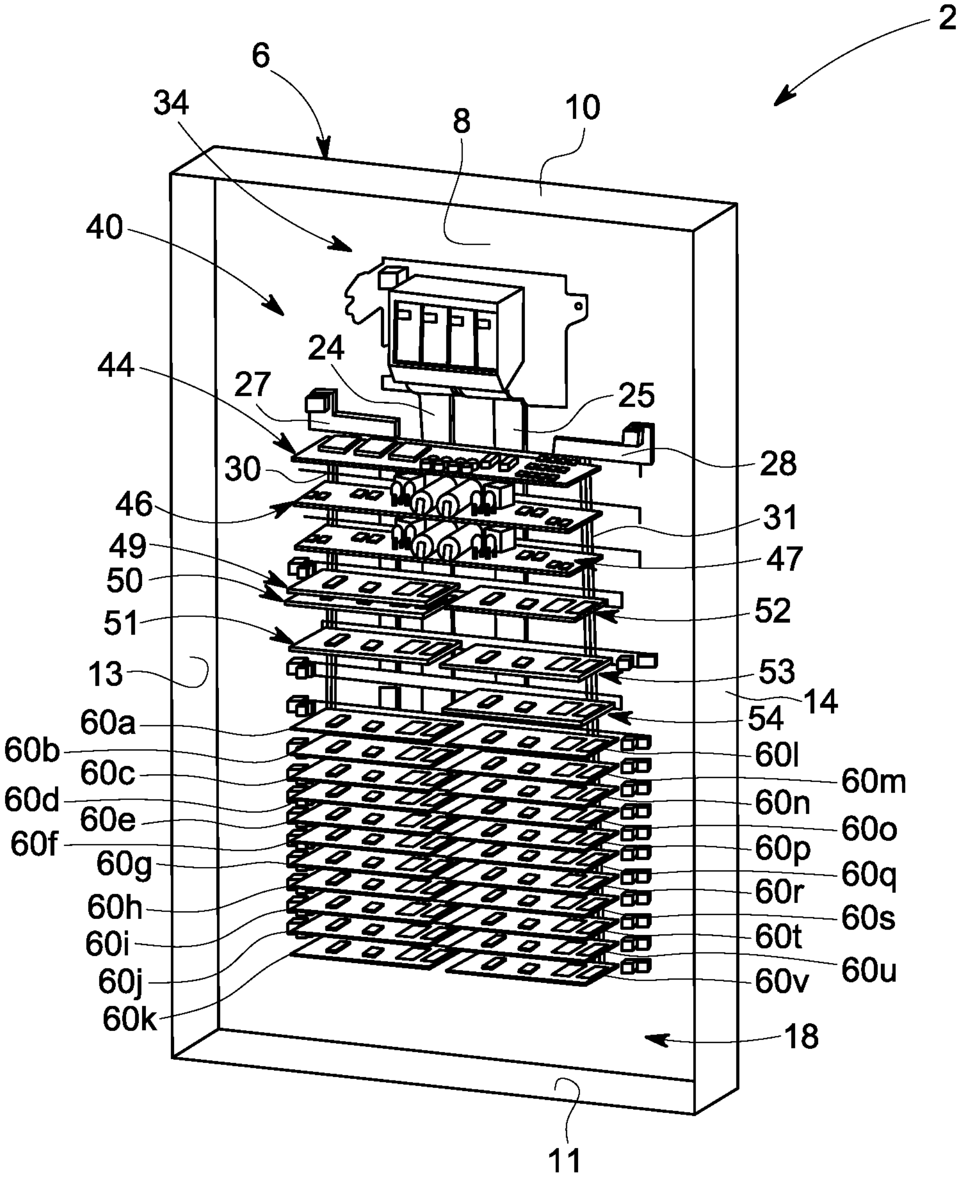
FIG. 1 is a partial perspective view of an electrical distribution system including a plurality of micro electro-mechanical switch (MEMS) devices in accordance with an exemplary embodiment.

With reference to FIG. 1, a load center in accordance with an exemplary embodiment is indicated generally at 2. Load center 2 includes a main housing 6 having a base wall 8, first and second opposing side walls 10 and 11, and third and fourth opposing side walls 13 and 14 that collectively define an interior portion 18. Load center 2 is also shown to include first and second bus bars 24 and 25, first and second neutral bars 27 and 28, and first and second control buses 30 and 31 mounted to base wall 8. A main circuit breaker 34 controls passage of an electric current from a mains supply (not shown) to first and second bus bars 24 and 25. Load center 2 also includes a micro electro-mechanical switch (MEMS) based electric distribution system 40 that controls passage of an electrical current between first and second bus bars 24 and 25 and a plurality of branch circuits (not shown).

Figure 2:
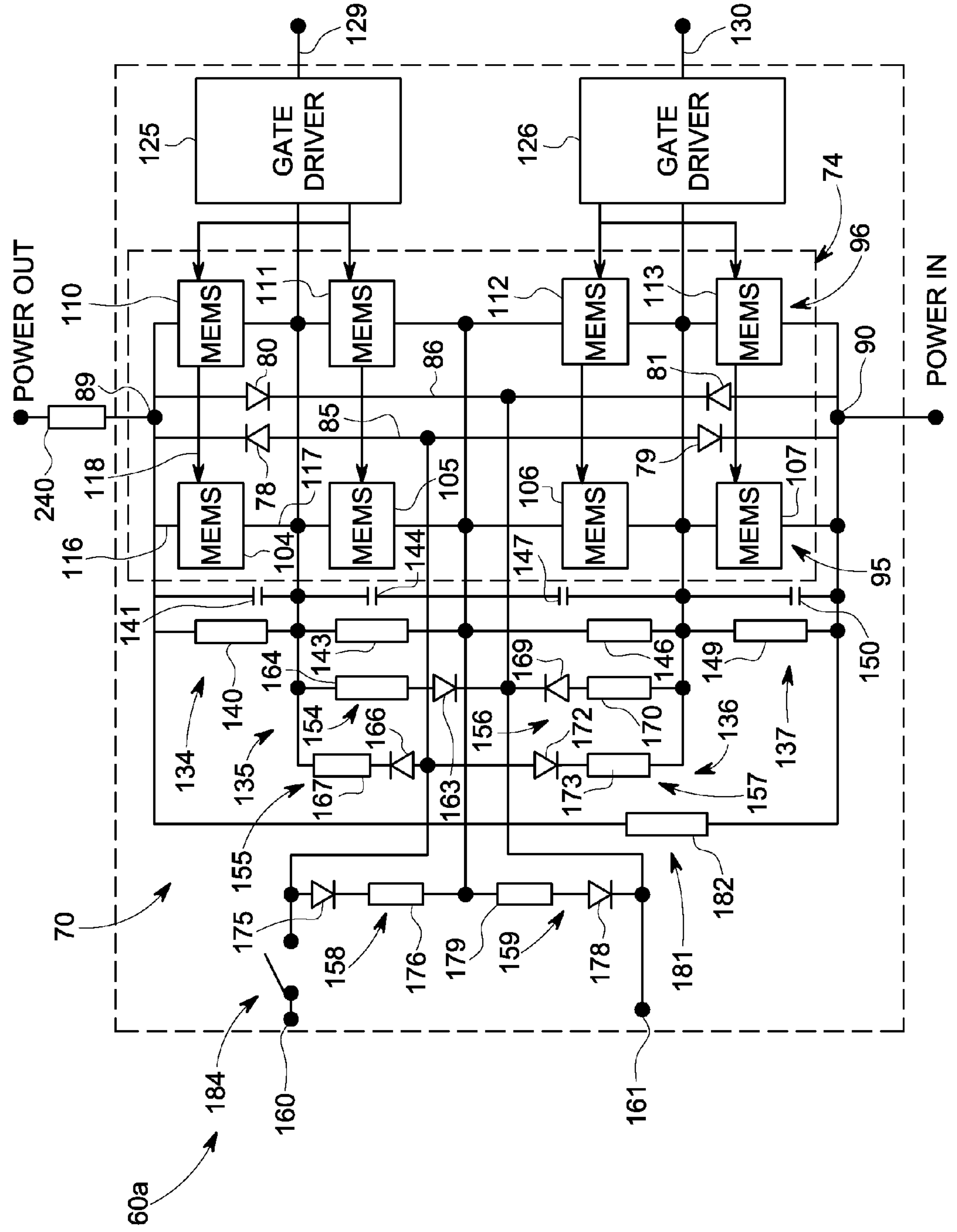
FIG. 2 is a schematic drawing illustrating a MEMS circuit breaker device in accordance with an exemplary embodiment.

Electric distribution system 40 includes a MEMS control board 44 connected to first and second bus bars 24 and 25 as well as first and second control busses 30 and 31. MEMS control board 44 selectively controls a plurality of Hybrid Arcless Limiting Technology (HALT) boards 46 and 47 which in turn signal a plurality of MEMS circuit breaker devices 49-54 and 60*a*-60*v*. MEMS circuit breaker devices 49-54 constitute dual pole circuit breaker elements that are connected to each of first and second bus bars 24 and 25, while MEMS circuit breaker devices 60*a*-60*v* constitute single pole circuit breaker elements that are each connected to a single one of first and second bus bars 24 and 25. That is, circuit breaker devices 60*a*-60*k* are coupled to first bus bar 24 and circuit breaker boards 601-60*v* are coupled to second bus bar 25. As each circuit breaker board is substantially similar, a detailed description will follow with reference to FIG. 2 in describing circuit breaker board 60*a* with an understanding that circuit breaker boards 49-54 and 60*b*-60*v* include similar structure.

In accordance with an exemplary embodiment, circuit breaker board 60*a* includes a switching system 70 having a MEMS switch array 74 that is closely coupled to a plurality of corner diodes 78-81. MEMS switch array 74 is connected at center points (not separately labeled) of a balanced diode bridge (not separately labeled) formed by diode 78-81. The term "closely coupled" should be understood to mean that MEMS switch array 74 is coupled to corner diodes 78-81 with as small of a loop area as possible so as to limit the voltage created by stray inductance associated with the loop area to below about 1V. The loop area is defined as the area between each MEMS device or die in MEMS switch array 74 and the balanced diode bridge. In accordance with one aspect of the exemplary embodiment, an inductive voltage drop across MEMS switch array 74 during a switching event is controlled by maintaining a small loop inductance between MEMS switch array 74 and corner diodes 78-81. The inductive voltage across MEMS switch array 74 during switching is determined by three factors: The length of the loop area which establishes the level of stray inductance; MEMS switch current that is between about 1 A and about 10 A per parallel leg; and MEMS switching time which is about 1 μsec.

In accordance with one aspect of the exemplary embodiment, each die in MEMS switch array 74 carries about 10 A of current and can switch in approximately 1 microsecond. In further accordance with the exemplary aspect, total current transferred to the diode bridge would be 2 times the die capability or 20 A. Given the equation $V=L*di/dt$, stray inductance would be held to no more than about 50 nH. However, if each die in MEMS switch array was configured to carry 1 A, then stray inductance could be as high as about 500 nH.

In still further accordance with the exemplary embodiment, the desired loop area can be achieved by, for example, mounting MEMS switch array 74 on one side of a circuit board (not separately labeled) and corner diodes 78-81 on another side of the circuit board, directly opposite MEMS switch array 74. In accordance with another example, corner diodes 78-81 could be positioned directly between two parallel arrangements of MEMS dies as will be discussed more fully below. In accordance with still another example, corner diodes 78-81 could be integrally formed within one or more of the MEMS dies. In any event, it should be understood that the particular arrangement of MEMS switch array 74 and corner diodes 78-81 can vary so long as the loop area, and, by extension, inductance, is maintained as small as possible. While embodiments of the invention are described employing corner diodes 78-81, it will be appreciated that the term "corner" is not limited to a physical location of the diodes, but is more directed to a placement of the diodes relative to the MEMS dies.

As discussed above, corner diodes 78-81 are arranged in a balanced diode bridge so as to provide a low impedance path for load current passing through MEMS switch array 74. As such, corner diodes 78-81 are arranged so as to limit inductance which, in turn, limits voltage changes over time, i.e., voltage spikes across MEMS switch array 74. In the exemplary embodiment shown, the balanced diode bridge includes a first branch 85 and a second branch 86. As used herein, the term "balanced diode bridge" describes a diode bridge that is configured such that voltage drops across both the first and second branches 85 and 86 are substantially equal when current in each branch 85, 86 is substantially equal. In first branch 85, diode 78 and diode 79 are coupled together to form a first series circuit (not separately labeled). In a similar fashion, second branch 86 includes diode 80 and diode 81 operatively coupled together to form a second series circuit (also not separately labeled). The balanced diode bridge is also shown to include connection points 89 and 90 that connect with one of first and second bus bars 24 and 25.

In further accordance with an exemplary embodiment, MEMS switch array 74 includes a first MEMS switch leg 95 connected in series (m) and a second MEMS switch leg 96 also connected in series (m). More specifically, first MEMS switch leg 95 includes a first MEMS die 104, a second MEMS die 105, a third MEMS die 106, and a fourth MEMS die 107 connected in series. Likewise, second MEMS switch leg 96 includes a fifth MEMS die 110, a sixth MEMS die 111, a seventh MEMS die 112 and an eighth MEMS die 113 that are connected in series. At this point it should be understood that each MEMS die 104-107 and 110-113 can be configured to include multiple MEMS switches. In accordance with one aspect of the exemplary embodiment, each MEMS die 104-107 and 110-113 includes 50-100 MEMS switches. However, the number of switches for each die 104-107 and 110-113 could vary. First MEMS switch leg 95 is connected in parallel (n) to second MEMS switch leg 96. With this arrangement, first and second MEMS switch legs 95, 96 form an (m×n) array which, in the exemplary embodiment shown, is a (4×2) array. Of course, it should be understood that the number of MEMS switch dies connected in series (m) and in parallel (n) can vary.

As each MEMS switch 104-107 and 110-113 includes similar connections, a detailed description will follow with reference to MEMS switch 104 with an understanding that the remaining MEMS switches 105-107 and 110-113 include corresponding connections. MEMS switch 104 includes a first connection 116, a second connection 117, and a third connection 118. In one embodiment, first connection 116 may be configured as a drain connection, second connection 117 may be configured as a source connection and third connection 118 may be configured as a gate connection. Gate connection 118 is connected to MEMS switch 110 and to a first gate driver 125. First gate driver 125 is associated with MEMS switches 104, 105, 110, and 111. A second gate driver 126 is associated with MEMS switches 106, 107, 112, and 113. Each gate driver 125, 126 includes multiple isolated outputs (not separately labeled) that are electrically coupled to MEMS switches 104-107 and 110-113 as shown. First and second gate drivers 125 and 126 also include corresponding control connections 129 and 130 that are connected to MEMS control board 44 through control bus 30. With this arrangement, gate drivers 125 and 126 provide the means for selectively changing the state (open/closed) of MEMS switches 104-107, and 110-113.

In still further accordance with an exemplary embodiment, switching system 70 includes a plurality of grading networks connected to first and second MEMS switch legs 95 and 96. More specifically, switching system 70 includes a first grading network 134 electrically connected, in parallel, to first and fifth MEMS switches 104 and 110, a second grading network 135 is electrically connected, in parallel, to second and sixth MEMS switches 105 and 111, a third grading network 136 is electrically connected, in parallel, to third and seventh MEMS switches 106 and 112, and a fourth grading network 137 is electrically connected, in parallel, to fourth and eighth MEMS switches 107 and 113.

First grading network 134 includes a first resistor 140 connected in parallel to a first capacitor 141. First resistor 140 has a value of about 10K ohms and first capacitor 141 has a value of about 0.1 μF. Of course it should be understood that the values of first resistor 140 and first capacitor 141 can vary. Second grading network 135 includes a second resistor 143 connected in parallel with a second capacitor 144. Second resistor 143 and second capacitor 144 are similar to first resistor 140 and first capacitor 141 respectively. Third grading network 136 includes a third resistor 146 and a third capacitor 147. Third resistor 146 and third capacitor 147 are similar to first resistor 140 and first capacitor 141 respectively. Finally, fourth grading network 137 includes a fourth resistor 149 and a fourth capacitor 150. Fourth resistor 149 and fourth capacitor 150 are similar to first resistor 140 and first capacitor 141 respectively. Grading networks 134-137 aid in changing position of corresponding ones of MEMS switches 104-107 and 110-113. More specifically, grading networks 134-137 ensure a uniform voltage distribution across each MEMS element connected in series.

Switching system 70 is also shown to include a first intermediate branch circuit 154, a second intermediate branch circuit 155, a third intermediate branch circuit 156, a fourth intermediate branch circuit 157, a fifth intermediate branch circuit 158 and a sixth intermediate branch circuit 159. Intermediate branch circuits 154-159 are electrically connected between respective ones of first and second gate drivers 125 and 126 and first and second branches 85 and 86 of the balanced diode bridge. More specifically, first, second and fifth intermediate branch circuits 154, 155 and 158 are connected between first branch 85 and first grading network 134; and third, fourth, and sixth intermediate branch circuits 156, 157, and 159 are connected between second branch 86 and third grading network 136. In addition, fifth and sixth intermediate branch circuits 158 and 159 are coupled between a HALT connection point having a first HALT connector member 160 and a second HALT connector 161.

First intermediate branch circuit 154 includes a first intermediate diode 163 and a first intermediate resistor 164. The term intermediate diode should be understood to mean a diode that is connected across only a portion of MEMS switch array 74 as opposed to a corner diode that is connected across the entirety of MEMS switch array 74. Second intermediate branch circuit 155 includes a second intermediate diode 166 and a second intermediate resistor 167. Third intermediate branch circuit 156 includes a third intermediate diode 169 and a third intermediate resistor 170, and fourth intermediate branch circuit 157 includes a fourth intermediate diode 172 and a fourth intermediate resistor 173. Fifth intermediate branch circuit 158 includes a fifth intermediate diode 175 and a fifth intermediate resistor 176. Finally, sixth intermediate branch circuit 158 includes a sixth intermediate diode 178 and a sixth intermediate resistor 179. The arrangement of intermediate diodes 163, 166, 169, 172, 175, and 178 and intermediate resistors 164, 167, 170, 173, 176, and 179 ensures that current flow through intermediate branch circuits 154-159 remains low thereby allowing for a the use of lower rated circuit components. In this manner the cost and size of the intermediate diodes remains low. As such, in an M×N MEMS array switch only the corner diodes 78-81 need to possess a higher current rating, i.e., a current rating in the range of worst possible current flowing through load under a fault condition. While all other diodes of MEMS array can be of much smaller current rating.

Switching system 70 is further shown to include a voltage snubber 181 that is connected in parallel with first and second pluralities of MEMS switches 104-107 and 110-113. Voltage snubber 181 limits voltage overshoot during fast contact separation of each of MEMS switches 104-107 and 110-113. Voltage snubber 181 is shown in the form of a metal-oxide varistor (MOV) 182. However, it should be appreciated by one of ordinary skill in the art that voltage snubber 181 can take on a variety of forms including circuits having a snubber capacitor connected in series with a snubber resistor. Switching system 70 is also shown to include a HALT switch connection 184 that connects fifth intermediate branch circuit 158 to an associated one of HALT boards 46 and 47 to power a HALT circuit 190 arranged on HALT board 46 as will be described more fully below.

Figure 3:
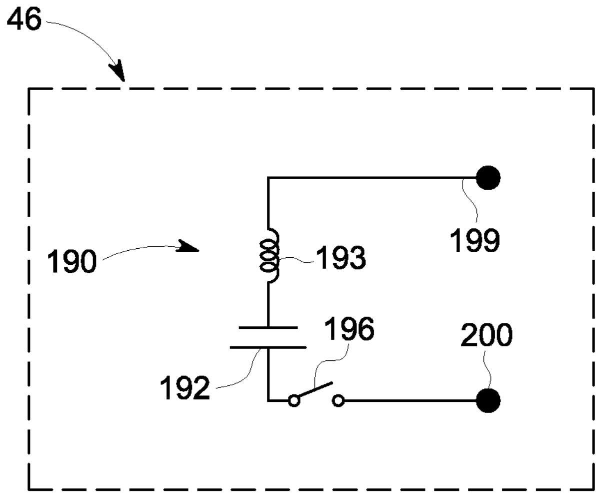
FIG. 3 is a schematic view of a Hybrid Arcless Limiting Technology (HALT) circuit board in accordance with an exemplary embodiment.

Reference will now be made to FIG. 3 in describing HALT board 46 with an understanding that HALT board 47 includes similar components. HALT board 46 includes a HALT circuit 190 that facilitates the introduction of a protective pulse to switching system 70. HALT circuit 190 includes a HALT capacitor 192 coupled in series with a HALT inductor coil 193. HALT circuit 190 is further shown to include a HALT activation switch 196 as well as a pair of terminals or connectors 199 and 200. Connectors 199 and 200 provide an interface with switching system 70. More specifically, connectors 199 and 200 are electrically connected between first and second HALT connector members 160 and 161. As will be discussed more fully below, HALT activation switch 196 is selectively closed to electrically connect HALT circuit 190 to switching system 70 to trigger MEMS switches 104-107 and 111-113 to pass an electrical current between connection points 89 and 90. HALT circuit 190 is also selectively activated to trigger MEMS switches 104-107 and 111-113 to open thereby cutting off current flow between connection points 89 and 90. In addition, it should be understood, that switching system 70 may be electrically connected to multiple HALT circuits. For example, it may be desirable to employ a primary HALT circuit and a secondary HALT circuit. The primary HALT circuit is employed to, for example, close the circuit breaker device allowing current flow, and the secondary HALT circuit is employed to immediately open the circuit breaker device and cut off current flow in the event that a fault is detected. That is, the secondary HALT device provides a back up to the primary HALT circuit allowing for multiple circuit breaker device responses without the need to wait for HALT components to re-energize.

Figure 4:
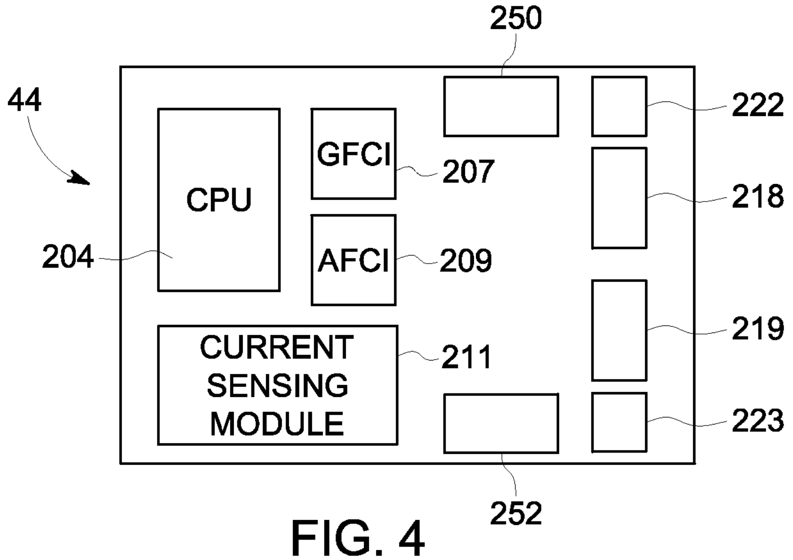
FIG. 4 is a block diagram illustrating a MEMS control board in accordance with one aspect of the exemplary embodiment.

Reference will now be made to FIG. 4 in describing MEMS control board 44 in accordance with one aspect of the exemplary embodiment. MEMS control board 44 includes a central processor (CPU) 204 that is may include a ground fault circuit interruption (GFCI) module and logic 207, and an arc fault circuit interruption module and logic 209. MEMS control board 44 is also shown to include first and second power terminals 218 and 219 that are coupled to first and second bus bars 24 and 25 as well as first and second control terminals 222 and 223 that are coupled to control busses 30 and 31. With this arrangement, MEMS control board 44 monitors electrical current flow data from each circuit breaker board 49-54 and 60*a*-60*v*. In the event of user selected opening/closing or a fault condition, such as a ground fault, arc fault or a short circuit, MEMS control board 44 will open the switching system associated with the circuit breaker board 49-54 and 60*a*-60*v* experiencing the fault to protect the branch circuits. MEMS control board 44 receives current flow data from a current sensor such as shown at 240 in FIG. 2, mounted to each circuit breaker board 49-54 and 60*a*-60*v*. MEMS control board 44 may also include one or more wireless transmitters 250 and one or more wireless receivers 252 that enable wireless communication with each circuit breaker board 49-54 and 60*a*-60*v*. Wireless transmitters 250 and wireless receivers 252 also enable communication with, and control through, a remote monitoring station.

Figure 5:
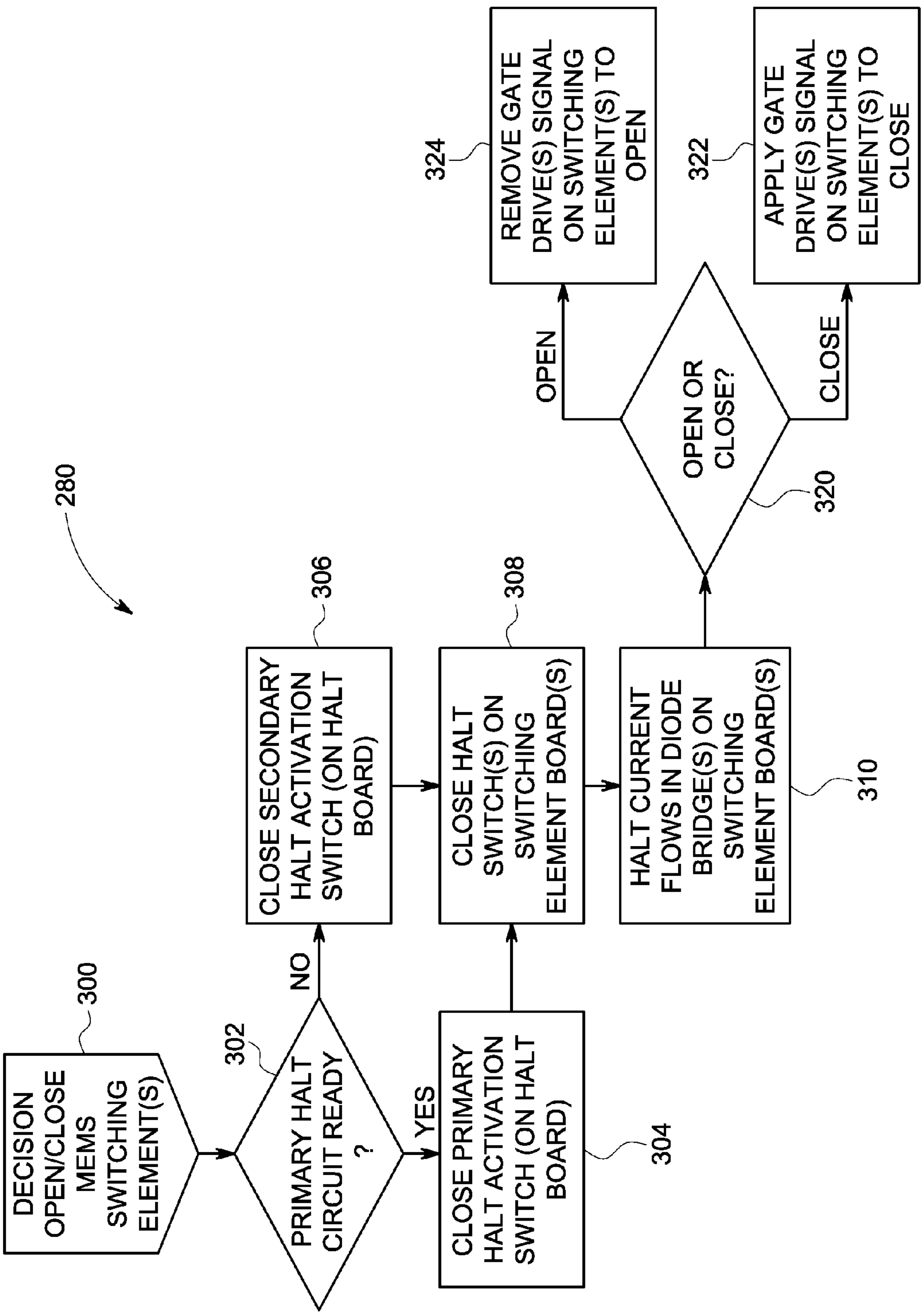
FIG. 5 is a flow diagram illustrating a method of changing a state of the MEMS circuit breaker device of FIG. 2.

Reference will now be made to FIG. 5 in describing a method 280 of opening/closing switching system 70. Initially, a decision is reached in CPU 204 to change a position of switching system 70 as indicated in block 300. At this point, CPU 204 checks the readiness of HALT circuit 190 in block 302. If HALT circuit 190 is ready, primary HALT switch 196 is closed as indicated in block 304. If HALT circuit 190 is not ready, secondary HALT switch 197 is closed as indicated in block 306. By ready it should be understood that if voltage is not above a predetermined threshold, the HALT circuit will not posses enough energy to activate the circuit breaker device and provide protection. In such a case, a different HALT circuit may be employed, or there may be a pause to allow the HALT circuit time to re-energize. At this point, the HALT switch on the associated MEMS circuit board is closed as indicated in block 308. HALT current flows to the diode bridge on the MEMS circuit board as indicate in block 310. At this point, a determination is made whether to open or close the switching system in block 320. If closing the switching system, CPU 204 passes a signal through one of the first and second control busses 30 and 31 to the gate drivers on the associated MEMS circuit breaker device causing the MEMS switches to change position and pass electrical current as indicated in block 322. If opening the switching system, CPU 204 cuts off the signal through one of the first and second control busses 30 and 31 to the gate drivers on the associated MEMS circuit breaker device causing the MEMS switches to change position and open thereby interrupting current flow through the associated MEMS circuit breaker device as indicated in block 324.

Figure 6:
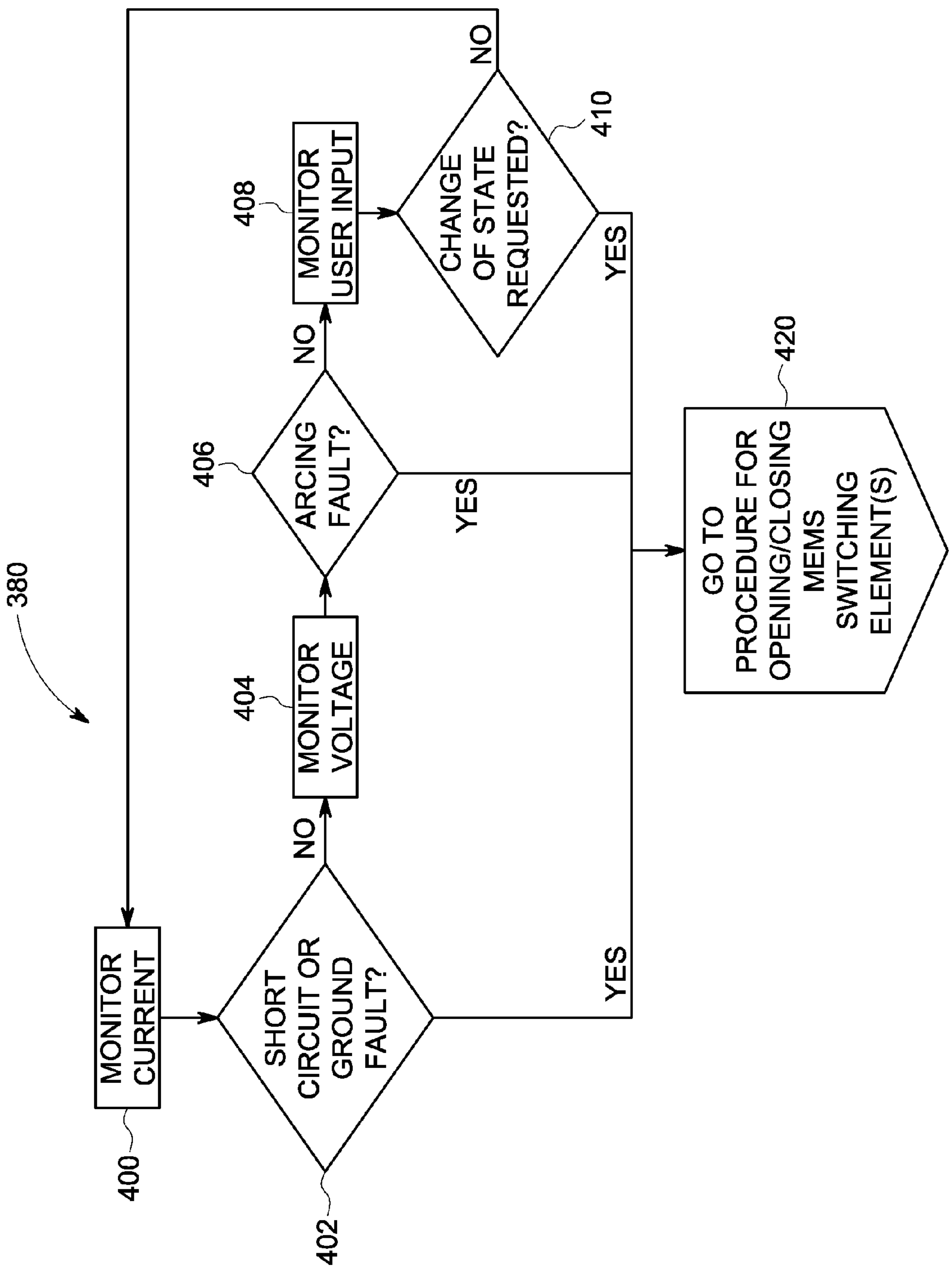
FIG. 6 is a flow diagram illustrating a method of opening the MEMS circuit breaker device of FIG. 2.

Reference will now be made to FIG. 6 in describing a method 380 of deciding to open a switch assembly in accordance with an exemplary embodiment. Initially, current passing through the switch assembly is monitored as indicated in block 400. Current sensing module 211 monitors for a short circuit and GFCI module monitors for a ground fault as indicated in block 402. If no short circuit or ground fault is found, voltage is monitored as indicated in block 404 and AFCI module 209 monitors for arc faults in block 406. CPU 204 also monitors for user input in block 408. If a change of state is requested as shown on block 410, or if a short circuit, ground fault, or arc fault is detected in blocks 402 and 404, method 280 is initiated to open the switch assembly as indicated in block 420 to protect the branch circuit associated with the affected MEMS circuit breaker.

At this point it should be understood that the present invention provides a system that utilizes MEMS devices to pass and/or interrupt current between electrical mains and branch circuits. The MEMS devices are controlled by a MEMS control board that monitors current and voltage. In the event of a current or voltage fault, the MEMS control board signals the MEMS device(s) to open and interrupt current flow. The use of a MEMS control board removes the need to provide dedicated ground fault, arc fault and short circuit monitoring at each circuit breaker. In addition, the use of MEMS devices will lead to a size and cost reduction for each circuit breaker. It should be also understood that current and voltage ratings for each MEMS device can vary based on a particular circuit rating. Also, the number of MEMS devices/dies used in a particular MEMS circuit breaker can also vary. In addition, while shown and described as an industrial/residential load center, the exemplary embodiments can be incorporated into a wide array of electrical protection devices or systems that would benefit from circuit monitoring and protection.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrical distribution system comprising:

at least one circuit breaker device including an electrical interruption system having an electrical pathway, at least one micro electro-mechanical switch (MEMS) device electrically coupled in the electrical pathway, at least one hybrid arcless limiting technology (HALT) connection, and at least one control connection;

a HALT circuit member electrically coupled to the HALT connection on the circuit breaker device; and a controller electrically coupled to the control connection on the circuit breaker device, the controller being configured and disposed to selectively connect the HALT circuit member and the at least one circuit breaker device via the HALT connection to control electrical current flow through the at least one circuit breaker device to a bus bar of the electrical distribution system.

2. The electrical distribution system according to claim 1, wherein the at least one circuit breaker device comprises a plurality of circuit breaker devices electrically coupled to the HALT circuit member.

3. The electrical distribution system according to claim 1, wherein the at least one circuit breaker device includes an arc fault circuit interrupt (AFCI) device.

4. The electrical distribution system according to claim 1, wherein the at least one circuit breaker includes a ground fault circuit interrupt (GFCI) device.

5. The electrical distribution system according to claim 1, wherein the controller includes a wireless receiver and a wireless transceiver, the wireless transceiver and wireless transceiver being configured and disposed to selectively connect and selectively disconnect the HALT circuit member from the at least one circuit breaker.

6. The electrical distribution system according to claim 1, wherein the MEMS device includes a plurality of diodes forming a diode bridge, and a MEMS switch array closely coupled to the plurality of diodes.

7. The electrical distribution system according to claim 6, wherein the MEMS switch array comprises an (M×N) array of MEMS dies, the (M×N) array of MEMS dies including a first MEMS switch circuit electrically connected in parallel with a second MEMS switch circuit, the first MEMS switch circuit including a first plurality of MEMS dies electrically connected in series, and the second MEMS switch circuit including a second plurality of MEMS dies electrically connected in series.

8. An electrical load center comprising:

a main housing including a plurality of walls that define an interior portion;

a bus bar extending within the interior portion of the main housing;

at least one circuit breaker device electrically coupled to the bus bar, the at least one circuit breaker including an electrical interruption system having an electrical pathway, at least one micro electro-mechanical switch (MEMS) device electrically coupled in the electrical pathway, at least one hybrid arcless limiting technology (HALT) connection, and at least one control connection;

a HALT circuit member electrically coupled to HALT connection on the circuit breaker device; and a controller electrically coupled to the control connection on the circuit breaker device, the controller being configured and disposed to selectively connect the HALT circuit member and the at least one circuit breaker device via the HALT connection to control electrical current flow through the at least one circuit breaker device.

9. The electrical, load center according to claim 8, wherein the at least one circuit breaker device includes an arc fault circuit interrupt (AFCI) device.

10. The electrical load center according to claim 8, wherein the at least one circuit breaker includes a ground fault circuit interrupt (GFCI) device.

11. The electrical load center according to claim 8, wherein the controller includes a wireless receiver and a wireless transceiver, the wireless transceiver and wireless transceiver being configured and disposed to selectively connect and selectively disconnect the HALT circuit member from the at least one circuit breaker.

12. The electrical load center according to claim 8, further comprising: another bus bar extending within the interior portion of the main housing adjacent the bus bar.

13. The electrical load center according to claim 12, further comprising: another HALT circuit member.

14. The electrical load center according to claim 13, wherein the at least one circuit breaker device includes a first circuit breaker device electrically coupled to the bus bar and a second circuit breaker device electrically coupled to the another bus bar, the controller, and the another HALT circuit member.

15. A method of controlling an electrical circuit in an electrical load center, the method comprising:

signaling a circuit breaker device having at least one micro electro-mechanical switch (MEMS) device to pass an electrical current through an electrical pathway to a bus bar of the electrical load center;

closing a hybrid arcless limiting technology (HALT) switch to pass a signal to the at least one MEMS device;

switching the MEMS device to conduct the electrical current through the electrical pathway;

sensing an undesirable current parameter of the electrical current;

opening the HALT switch to cut off the signal to the at least one MEMS device; and switching the at least one MEMS device to open the electrical pathway.

16. The method of claim 15, wherein sensing the undesirable current parameter comprise detecting an electrical short in the electrical current.

17. The method of claim 15, wherein sensing the undesirable current parameter includes sensing an arc fault in the electrical current.

18. The method of claim 15, wherein sensing the undesirable current parameter includes sensing a ground fault in the electrical current.

19. The method of claim 15, further comprising:

sending a wireless signal to the circuit breaker device; and switching the at least one MEMS device to open the electrical pathway in response to the wireless signal.

20. The method of claim 15, further comprising: sending a wireless signal from the circuit breaker device to a remote monitoring station.

* * * * *

UNITED STATES PATENT AND TRADEMARK OFFICE

CERTIFICATE OF CORRECTION

PATENT NO. : 8,570,713 B2
APPLICATION NO. : 13/172214
DATED : October 29, 2013
INVENTOR(S) : Kumfer et al.

It is certified that error appears in the above-identified patent and that said Letters Patent is hereby corrected as shown below:

In the Specifications:

Column 5, Lines 56-57, delete “sixth intermediate branch circuit 158” and insert -- sixth intermediate branch circuit 159 --, therefor.

In the Claims:

Column 8, Line 48, in Claim 5, delete “the wireless transceiver” and insert -- the wireless receiver --, therefor.

Column 9, Line 18, in Claim 9, delete “electrical,” and insert -- electrical --, therefor.

Column 9, Line 26, in Claim 11, delete “the wireless transceiver” and insert -- the wireless receiver --, therefor.

Signed and Sealed this
Twenty-second Day of April, 2014

Michelle K. Lee

Michelle K. Lee
*Deputy Director of the United States Patent and Trademark Office*